(No Model.)
J. K. BOWMAN.
VEHICLE WHEEL.
No. 596,735. Patented Jan. 4, 1898.
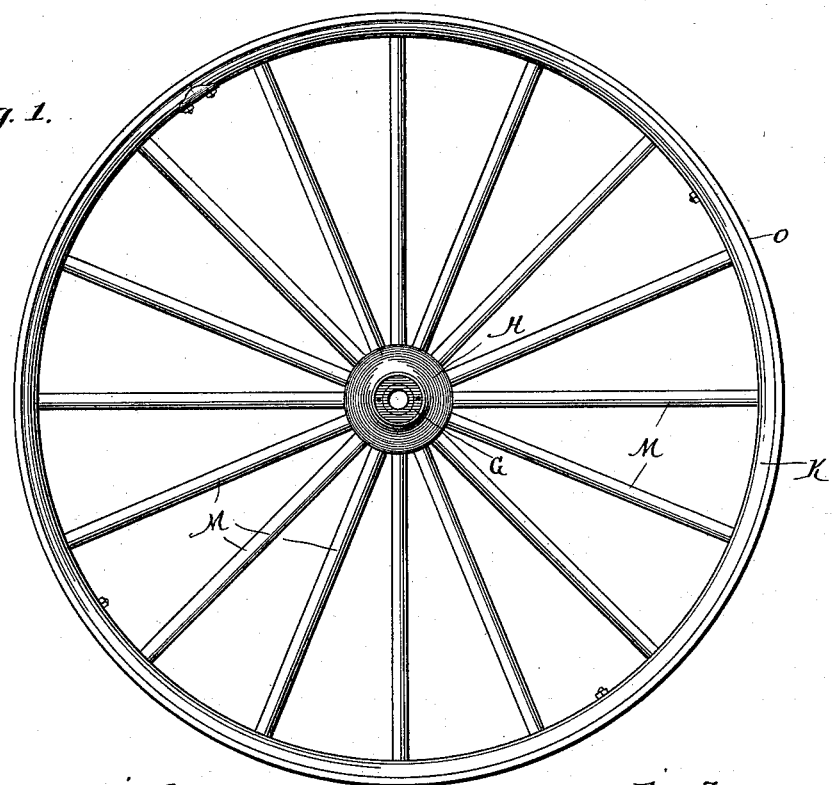
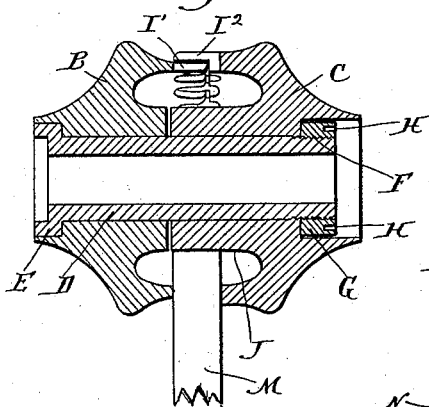
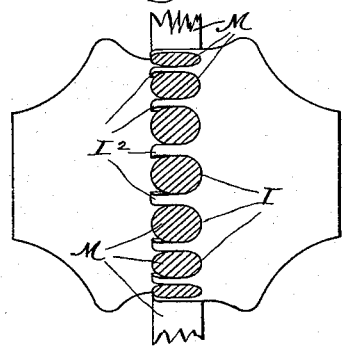
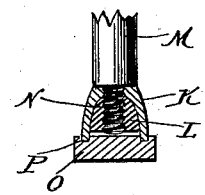
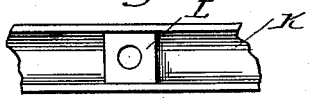
Witnesses:
H. B. Hallock
J. J. Williamson
Inventor:
Joseph K. Bowman
by Geo. W. Holgate
Attorney

UNITED STATES PATENT OFFICE.

JOSEPH K. BOWMAN, OF GRUBBS, DELAWARE.

VEHICLE-WHEEL.

SPECIFICATION forming part of Letters Patent No. 596,735, dated January 4, 1898.

Application filed August 6, 1897. Serial No. 647,283. (No model.)

*To all whom it may concern:*

Be it known that I, JOSEPH K. BOWMAN, a citizen of the United States, residing at Grubbs, in the county of New Castle and State of Delaware, have invented a certain new and useful Improvement in Vehicle-Wheels, of which the following is a specification.

My invention relates to a new and useful improvement in vehicle-wheels, and especially to the hubs thereof, and has for its object to provide a simple, cheap, and effective device of this description which will permit the formation of a wheel entirely of metal or the use of a metal hub in connection with a wooden wheel and accomplish the securement of the spokes within the hub in such manner as to permit their being clamped therein and tightened at any time that occasion may require or the ready removal of one or more spokes and the substitution of others therefor.

With these ends in view this invention consists in the details of construction and combination of elements hereinafter set forth, and then specifically designated by the claim.

In order that those skilled in the art to which this invention appertains may understand how to make and use the same, the construction and operation will now be described in detail, referring to the accompanying drawings, forming a part of this specification, in which—

Figure 1 is a side view of a wheel made in accordance with my improvement; Fig. 2, a longitudinal section of a hub having my improvements embodied therein; Fig. 3, a plan view of said hub, the spokes being sectioned away, so as to more clearly show the method of securing them in place; Fig. 4, a detail cross-section of the felly and tire; and Fig. 5, a view looking within the felly, the tire being removed.

In carrying out my invention as here embodied, A represents the hub of the wheel, which is made in two sections B and C, and each of these sections is adapted for the reception of the box D, which, passing through the center thereof, alines these two sections and brings them into their proper relative position to each other. The box is enlarged, as indicated at E, thereby forming a shoulder which fits within a recess formed in the section B, while the opposite end of the box is threaded, as indicated at F, for the reception of the nut G, so that when this nut is run upon the threaded end of the box the two sections of the hub are brought together and held firmly against displacement, and this nut for convenience in manipulation is provided with the wrench-holes H for the reception of the forked wrench, and I prefer that this end of the box and the outer surface of the nut shall lie below the outer end of the hub in order that the spindle-nut may be run in place to hold the hub against displacement.

A series of sockets are formed for the reception of the spokes I by the interdental spaces I', formed in the section B, and a notched flange I², formed with the section C, overlaps the section B. The butt-ends of the spokes are supported and sustained by the surface J, formed upon the section C, as clearly shown in Fig. 2.

K represents the rim or felly of the wheel, which is here shown as made of U shape in cross-section, as indicated in Fig. 4, and within the groove thus formed the nuts L are placed, which are of such shape as to conform to the cross-section of this groove and be held against rotary motion in order that when the spokes M have their threaded ends N run within the nuts no wrench will be necessary to prevent the turning of the nut, and this will also prevent a retrograde movement thereof, thereby holding the spokes in place so long as the latter are prevented from turning upon their axes, which, as is obvious, cannot take place when their butt-ends are clamped within the hub, as before described. A tire O may be secured around the rim by having grooves therein, as indicated at P, adapted to fit over the edges of the rim, and in practice this tire is made of sufficient internal diameter to be passed around the rim when in a heated condition, and when shrunk by cooling will fit tightly upon the rim, as is well understood in wheel-making.

While the grooves P will serve to hold the tire from displacement, I have found that they are not absolutely essential, since when the tire is properly shrunk upon the rim no further provision need be made for its securement.

From the foregoing description the manner of assembling my improved wheel will be obviously as follows: The nuts L one by one are placed within the U-shaped groove of the rim and the threaded ends of the spokes run therein until the butt-ends of the latter are in proper position within the interdental spaces in the hub, and after the entire series of spokes have been thus placed the section B of the hub is brought into engagement with the butt-ends of the spokes and the section C then placed in position and the box passed through these two sections and the entire device firmly secured together by the running on of the nut G. This completes the wheel, and if at any time any portion thereof should become injured, strained, or worn it may be replaced by the substitution of another part therefor by simply reversing the operation just set forth.

While my improvements are especially adapted for the construction of metallic wheels, it is obvious that the spokes and rim of the wheel may be of wood or other suitable material, while the hub is of metal, since the principal feature of my invention rests in the hub.

Having thus fully described my invention, what I claim as new and useful is—

A vehicle-wheel consisting of a hub formed in two sections each of said sections having an overhanging flange projecting inwardly and interdental teeth formed in the edges of said flanges, the flange of one of the sections overhanging the flange of the other whereby the spokes will be completely surrounded and be prevented from movement in any direction, a supporting extension formed beneath the flange of one of the sections on which the butt-ends of the spokes are adapted to rest, a box passed through the center of the hub and a nut run on the threaded end of the box clamping the parts together, substantially as shown and described.

In testimony whereof I have hereunto affixed my signature in the presence of two subscribing witnesses.

JOSEPH K. BOWMAN.

Witnesses:
S. S. WILLIAMSON,
ALLISON W. McCURDY.